United States Patent
Muñoz De La Torre Alonso et al.

(10) Patent No.: US 12,177,752 B2
(45) Date of Patent: Dec. 24, 2024

(54) OPTIMIZATION OF SERVICES APPLIED TO DATA PACKET SESSIONS

(71) Applicant: Telefonaktiebolaget LM Ericsson (publ), Stockholm (SE)

(72) Inventors: Miguel Angel Muñoz De La Torre Alonso, Madrid (ES); Veronica Sanchez Vega, Madrid (ES); Carlos Jimenez Cordon, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 569 days.

(21) Appl. No.: 17/602,948

(22) PCT Filed: May 16, 2019

(86) PCT No.: PCT/EP2019/062706
§ 371 (c)(1),
(2) Date: Oct. 11, 2021

(87) PCT Pub. No.: WO2020/207607
PCT Pub. Date: Oct. 15, 2020

(65) Prior Publication Data
US 2022/0191664 A1 Jun. 16, 2022

(30) Foreign Application Priority Data
Apr. 11, 2019 (EP) .................................. 19382272

(51) Int. Cl.
*H04W 4/50* (2018.01)
*H04W 8/18* (2009.01)
(Continued)

(52) U.S. Cl.
CPC ............. *H04W 4/50* (2018.02); *H04W 8/18* (2013.01); *H04W 76/10* (2018.02); *H04W 80/10* (2013.01)

(58) Field of Classification Search
CPC ............. H04W 4/50; H04W 8/18; H04W 76/10–12; H04W 80/10; H04L 65/1095; H04L 67/14
See application file for complete search history.

(56) References Cited

U.S. PATENT DOCUMENTS

2016/0198297 A1 * 7/2016 Jodlauk ................... H04W 4/40
455/456.3
2017/0250903 A1 * 8/2017 Rasanen ................. H04L 41/50
(Continued)

FOREIGN PATENT DOCUMENTS

| CN | 108616555 A | 10/2018 |
| CN | 108632308 A | 10/2018 |
| WO | WO-2016102516 A1 * | 6/2016 |

OTHER PUBLICATIONS

International Search Report and Written Opinion dated Sep. 12, 2019 for International Application No. PCT/EP2019/062706 filed May 16, 2019, consisting of 10-pages.
(Continued)

*Primary Examiner* — Chi H Pham
*Assistant Examiner* — Vladislav Y Agureyev
(74) *Attorney, Agent, or Firm* — Weisberg I.P. Law, P.A.

(57) ABSTRACT

A method for operating a session control entity configured to control a data packet session for a mobile subscriber in a network, wherein at least one service is applied to the data packet session by a service application entity, the method includes at the session control entity receiving a first request from a requestor requesting application of the at least one service, in which it is requested that the requestor be informed of a current status of at least one session related parameter of the data packet session, and transmitting a notification to the requestor, the notification having the current status of the at least one session related parameter.

19 Claims, 8 Drawing Sheets

(51) Int. Cl.
*H04W 76/10* (2018.01)
*H04W 80/10* (2009.01)

(56) References Cited

U.S. PATENT DOCUMENTS

| | | | |
|---|---|---|---|
| 2018/0048655 A1 | 2/2018 | Zetterlund et al. | |
| 2018/0192471 A1* | 7/2018 | Li | H04W 16/04 |
| 2018/0199398 A1* | 7/2018 | Dao | H04W 76/34 |
| 2018/0359672 A1 | 12/2018 | Keller et al. | |
| 2019/0158408 A1* | 5/2019 | Li | H04W 72/56 |
| 2019/0253917 A1* | 8/2019 | Dao | H04W 28/0236 |
| 2019/0261260 A1* | 8/2019 | Dao | H04W 36/0011 |
| 2019/0313468 A1* | 10/2019 | Talebi Fard | H04W 60/04 |
| 2020/0036629 A1* | 1/2020 | Roeland | H04L 45/306 |
| 2020/0112907 A1* | 4/2020 | Dao | H04M 15/66 |
| 2020/0120022 A1* | 4/2020 | Stammers | H04L 12/4633 |
| 2020/0145876 A1* | 5/2020 | Dao | H04L 12/1407 |
| 2020/0146077 A1* | 5/2020 | Li | H04W 76/10 |
| 2020/0186462 A1* | 6/2020 | D'Acunto | H04L 45/306 |
| 2020/0214054 A1* | 7/2020 | Qiao | H04L 47/824 |
| 2020/0228420 A1* | 7/2020 | Dao | H04L 43/08 |
| 2020/0374352 A1* | 11/2020 | Ge | H04L 67/146 |
| 2021/0092588 A1* | 3/2021 | Xin | H04W 8/18 |
| 2021/0176613 A1* | 6/2021 | Purkayastha | H04L 67/10 |
| 2021/0274575 A1* | 9/2021 | Talebi Fard | H04W 76/12 |
| 2022/0132455 A1* | 4/2022 | Gupta | H04W 60/00 |
| 2022/0159605 A1* | 5/2022 | Li | H04W 60/00 |
| 2022/0294855 A1* | 9/2022 | Landais | H04L 67/142 |
| 2023/0163905 A1* | 5/2023 | Liu | H04W 48/18 370/329 |

OTHER PUBLICATIONS

3GPP TS 29.561 V15.1.0; 3rd Generation Partnership Project; Technical Specification Group Core Network and Terminals; 5G System; Interworking between 5G Network and external Data Networks; Stage 3 (Release 15), Sep. 2018, consisting of 46-pages.
3GPP TS 23.502 V16.0.2; 3rd Generation Partnership Project; Technical Specification Group Services and System Aspects; Procedures for the 5G System; Stage 2 (Release 16), Apr. 2019, consisting of 419-pages.
Chinese Office Action and English Summary dated Aug. 26, 2023 for Application No. 201980094810.9, consisting of 18 pages.

* cited by examiner

OPTIMIZATION OF SERVICES APPLIED TO DATA PACKET SESSIONS

CROSS-REFERENCE TO RELATED APPLICATIONS

This application is a Submission Under 35 U.S.C. § 371 for U.S. National Stage Patent Application of International Application No.: PCT/EP2019/062706, filed May 16, 2019 entitled "OPTIMIZATION OF SERVICES APPLIED TO DATA PACKET SESSIONS," which claims priority to European Application No.: 19382272.3, filed Apr. 11, 2019, the entireties of both of which are incorporated herein by reference.

TECHNICAL FIELD

The present application relates to a method for operating a session control entity and to the corresponding session control entity configured to control a data packet session. Furthermore, a method for operating a user plane entity is provided together with the corresponding user plane entity. Additionally, a method for operating a service application entity configured to apply at least one service to the data packet session is provided and the corresponding service application entity. Finally a system comprising at least two of the entities mentioned above is provided, a computer program and a carrier comprising the computer program.

BACKGROUND

FIG. 1 shows the architecture of a 5G core network comprising a Unified Data Repository, UDR 10, Network Exposure Function, NEF 20, a Network Data Analytics Function, NWDAF 30, an Application Function, AF 40, a Policy Control Function, PCF 50, a Charging Function CHF 60, an Access and Mobility Management Function, AMF 70, a Session Management Function, SMF 80, and a User Plane Function, UPF 90.

The different functions provided by the different modules shown in FIG. 1 are known to a person skilled in the art so that a detailed description of each of the entities is omitted for the sake of clarity. In the following only the functional entities relevant to the present specification will be discussed in more detail. The Session Management Function, SMF, 80 supports different functionality. It especially controls the traffic steering towards the N6 local area network, LAN or N6 in the UPF 90.

The User Plane Function, UPF 90, supports the handling of the User Plane Traffic, the packet routing and the forwarding including the traffic steering.

The term service chaining refers to steering of traffic across a set of network functions. IETF (Internet Engineering Task Force) has specified a solution for dynamic service chaining called Service Function Chaining which can be implemented by different technologies such as SDN (Software Defined Networks).

The service functions are deployed in the N6 reference point between UPF 90 and the external packet data network. Examples of such service functions are Traffic Optimization appliances such as TCP optimizers or HTTP proxies, Firewalls, traffic probes, CGNATs (Carrier Grade NAT), or Parental control functions.

Dynamic service chaining has a high value in operator's N6 LAN (Local Area Network). To reduce CAPEX operator needs to offload these service functions from unwanted traffic using dynamic chaining policies. For example, an operator might want to steer a given service data flow, e.g. progressive video over TCP from certain Content provider-, for a given subscriber, e.g. premium user only in certain conditions, e.g. when user roams in a given Radio Access Network type- and also in a way the data flows are load balanced across all the virtual instances of the TCP optimizer.

3GPP 29.561 defines interworking with external data network AAA (Authentication, Authorization and Accounting) server through RADIUS, where PGW or SMF 80 is usually acting as RADIUS client. RADIUS can be used for authorization, authentication or/and accounting, this depends on specific data network needs. Also, depending on the topology and RADIUS server deployment, in some cases RADIUS traffic is routed through N6 interface by the anchor UPF 90 acting as AAA proxy (in-band RADIUS). In some other cases, the RADIUS traffic is directly routed by SMF to the AAA server (out-of-band RADIUS).

Many of the service functions in N6 network need themselves some subscriber policies and subscriber context information from traffic such as e.g. IMSI (International Mobile Subscriber Identity), MSISDN (Mobile Subscriber Integrated Services Digital Network Number), Location, RAT-Type (Radio Access Technology). For example, a TCP optimizer might apply a different local optimization profile depending on the subscriber type or RAT type. Currently this is achieved by Service Functions receiving RADIUS Accounting messages for each subscriber session. The Service Function can receive such signaling by (1) sniffing silently or proxying RADIUS Accounting messages from N6 interface (in-band Radius integration), (2) being configured as RADIUS client of AAA server broadcasting RADIUS Accounting (out-of-band RADIUS integration), or (3) being configured as standalone AAA proxy (out-of-band RADIUS integration). The integration depends on the specific operator AAA deployment and can be very complex as the AAA deployment and configuration depend on the DNN and the authorization/accounting use case (in some cases the RADIUS accounting is not even enabled). In case of more dynamic enforcement policies are needed, in addition, the service function might directly integrate with PCF (through N7 interface).

The Service Functions need to be subscriber session aware in order to perform their tasks (e.g. a TCP Optimizer can use the RAT Type in order to optimize the subscriber's traffic in a certain way). The mechanisms used today for making the Service Functions subscriber session aware (out-of-band and/or in-band RADIUS integration, described in the background section) are not valid as most Service Functions are being virtualized and adopting control and user plane split architectures. Following our previous example, the TCP optimizer service function might be deployed in N control plane service function instances in a central data center and in M user plane service instances in local data center service network. Those instances can be scaled/migrated dynamically as per NFV (Network Functions Virtualization) management.

Specifically, the problems with the current solutions are:
Out-of-band or in-band RADIUS integration becomes too costly and complex as, depending on the Service Function CUPS (Control User Plane Separation) implementation, the operator would need to integrate its AAA server with, either one or many control plane instances, or, either one or many user plane instances which could be located in different hosts and different data center than the AAA. In addition, the operator might have limitations in the number of AAA proxies or number of broadcast clients a AAA server can support.

Additionally, in the case of in-band RADIUS integration, there will be extra challenges as now each service function instance manages a reduce set of subscriber sessions. Sniffing Radius traffic at N6 LAN would mean for the service function instance maintaining all subscriber sessions instead of just to the set of interest which would imply a suboptimal use of processing and memory resources. This problem cannot be easily solved by existing service chaining solutions as the subscriber session corresponding to given Radius accounting packet requires parsing of Radius accounting payload and cannot be directly inferred from existing service chaining classification rules which operate at 5 tuple level.

Accordingly, a need exists to overcome the above-mentioned problems and to simplify the integration of service functions provided by service application entities.

SUMMARY

This need is met by the features of the independent claims. Further aspects are described in the dependent claims.

According to a first aspect a method for operating a session control entity is provided, the session control entity configured to control a data packet session for a mobile subscriber in a network, wherein at least one service is applied to the data packet session by a service application entity. The session control entity receives a first request from a requestor requesting application of the at least one service, in which it is requested that the requestor be informed of a current status of at least one session related parameter of the data packet session. Furthermore, the session control entity transmits a notification to the requestor wherein the notification comprises the current status of the at least one session related parameter.

Furthermore, the corresponding session control entity is provided which comprises a memory and at least one processing unit wherein the memory contains instructions executable by the at least one processing unit. The session control entity is operative to work as discussed above or as discussed in further detail below.

Alternatively, a session control entity is provided configured to control a data packet session of a mobile subscriber in a network wherein at least one service is applied to the data packet session by a service application entity. The session control entity comprises a first module configured to receive a first request from a requestor requesting application of the at least one service, in which it is requested that the requestor be informed of a current status of at least one session related parameter of the data packet session. Furthermore, the session control entity comprises a second module configured to transmit a notification to the requestor wherein the notification comprises the current status of the at least one session related parameter.

Furthermore, a method for operating a user plane entity configured to forward the user plane data of the data packet session for a mobile subscriber in the network is provided wherein at least one service is applied to the data packet session by a service application entity. The user plane entity receives from the session control entity the session establishment request for establishing the data packet session wherein the session establishment request comprises a session control entity identifier which allows the session control entity configured to the control the data packet session to be identified. Furthermore, the user plane entity transmits a first notification to the service application entity wherein the first notification allows the session control entity which will control the data packet session to be identified.

Furthermore, the corresponding user plane entity is provided comprising a memory and at least one processing unit, wherein the memory contains instructions executable by the at least one processing unit wherein the user entity is operative to work as discussed above or as discussed in further detail below.

Alternatively, a user plane entity configured to forward the user plane data of the data packet session for the mobile subscriber is provided comprising a first module configured to receive a session establishment request from the session control entity for establishing the data packet session wherein the session establishment request comprises the identifier of the session control entity which allows the session control entity to be identified. A second module of the user plane entity is configured to transmit the first notification to the service application entity wherein this notification allows the session control entity to be identified.

As the user plane entity receives the identifier of the session control entity from the session control entity and forwards this information to the service application entity, the service application entity is informed which session control entity will handle the data packet session. Accordingly, the service application entity can then directly contact the session control entity so that the session control entity can inform the service application entity of the session related parameter.

Furthermore, a method for operating a service application entity is provided, the service application entity is configured to apply at least one service to the data packet session of the mobile subscriber in the network. The service application entity receives a first notification from the user plane entity configured to forward the user plane data of the data packet session, wherein this first notification allows the session control entity which will control the data packet session to be identified. Furthermore, a first request is transmitted to the session control entity requesting to be informed of a current status of at least one session related parameter of the data packet session. Furthermore, a response to the first request is received comprising the current status of the at least one session related parameter.

As the service application entity informs the session control entity that it wants to be informed about any session related parameter the service application entity is informed of the current status of the session related parameter so that the service application entity can then provide the required service to the data packet session.

Furthermore, the corresponding service application entity is provided comprising a memory and at least one processing unit wherein the memory contains instructions executable by the at least one processing unit wherein the service application entity is operative to work as discussed above or as discussed in further detail below.

As an alternative a service application entity is provided configured to apply at least one service to a data packet session for a mobile subscriber in a network wherein the service application entity comprises a first module configured to receive a first notification from a user plane entity configured to forward the user plane data of the data packet session. This first notification allows the session control entity which will control the data packet session to be identified. A second module is configured to transmit a first request to the session control entity requesting to be informed of the current status of at least one session related parameter of the data packet session. A third module is configured to receive a response to the first request which comprises the current status of the at least one session related parameter.

Furthermore, a system is provided comprising at least two of the above described entities.

Additionally, a computer program comprising program code to be executed by at least one processing unit of the session control entity, the user plane entity or the service application entity is provided wherein execution of the program code causes the at least one processing unit to execute a method as discussed above or as discussed in further detail below.

Furthermore, a carrier comprising the computer program is provided wherein the carrier is one of an electronic signal, optical signal, radio signal or computer readable storage medium.

It is to be understood that the features mentioned above and features yet to be explained below can be used not only in the respective combinations indicated, but also in other combinations or in isolation without departing from the scope of the present application. Features of the above-mentioned aspects and embodiments described below may be combined with each other in other embodiments unless explicitly mentioned otherwise.

Other features and advantages will become apparent to one with skill in the art upon examination of the following detailed description and figures.

DETAILED DESCRIPTION

Figure 1:
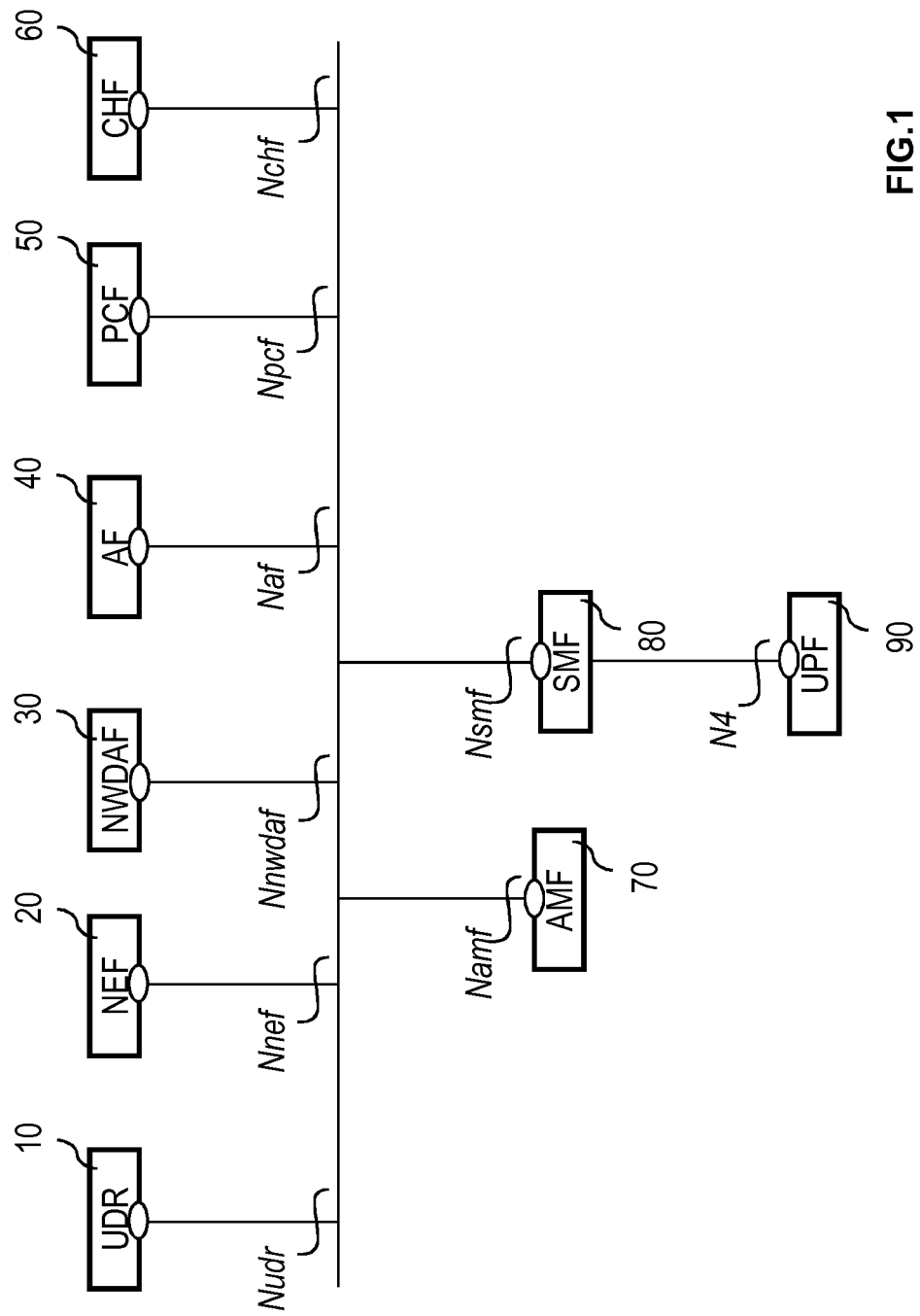
FIG. 1 shows a schematic architectural view a 5G cellular network.

In the following, embodiments of the invention will be described in detail with reference to the accompanying drawings. It is to be understood that the following description of embodiments is not to be taken in a limiting sense. The scope of the invention is not intended to be limited by embodiments described hereinafter or by the drawings, which are to be illustrative only.

The drawings are to be regarded as being schematic representations, and elements illustrated in the drawings are not necessarily shown to scale. Rather the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established or a wired or wireless connection. Functional blocks may be implemented in hardware, software, firmware, or a combination thereof.

Within the context of the present application the term user entity or user equipment, UE, refers to a device used by a person for his or her personal communication. It may be a telephone type of device, a cellular telephone, a mobile station, cordless phone, or personal digital assistant type of device like laptop, notebook, notepad, tablet equipped with a wireless data connection. The UE may also be associated with non-humans like animals, plants or machines.

The invention will be described in connection with the 5G network solution, however it should be understood that the mechanisms described below may also be applied in other networks such as 4G when the session control entity, SMF, is replaced by a control plane part of the packet gateway (PGW-C) or control plane part of the TDF (Traffic Detection Function) (TDF-C) and in which a user plane entity handling the user plane data of a data packet session, the UPF in the 5G network is replaced by the user plane part of the gateway (PGW-U) or the user plane part of the Traffic Detection Function (TDF-U).

As will be explained below the existing exposure service of a session control entity, the SMF in the example given below, can be extended to allow the exposure for subscriber session parameters of a data packet session.

The mechanism described below allows any service application entity, also called service function, SF hereinafter, to be a consumer for the SMF exposure service mentioned above. The service application entity is able to request or subscribe with a per user and/or per individual parameter of the data packet session granularity. This means that the consumer, e.g. the service application entity or the user plane entity, can subscribe to the producer (SMF) on a per user session basis, e.g. the consumer provides a UE session ID when subscribing.

The consumer can also subscribe on a user session parameter. Here the subscriber subscribes to any user session parameter such as the user location or the RAT type and does not care about the other parameters such as IMSI or MSISDN.

The UPF as an example of a user plane entity sends the SMF identifier to the service application entity in order to facilitate the discovery of the SMF, i.e., how the consumer knows which SMF handles the users of PDU session and exposes a subscriber session parameters mentioned above.

Figure 2:
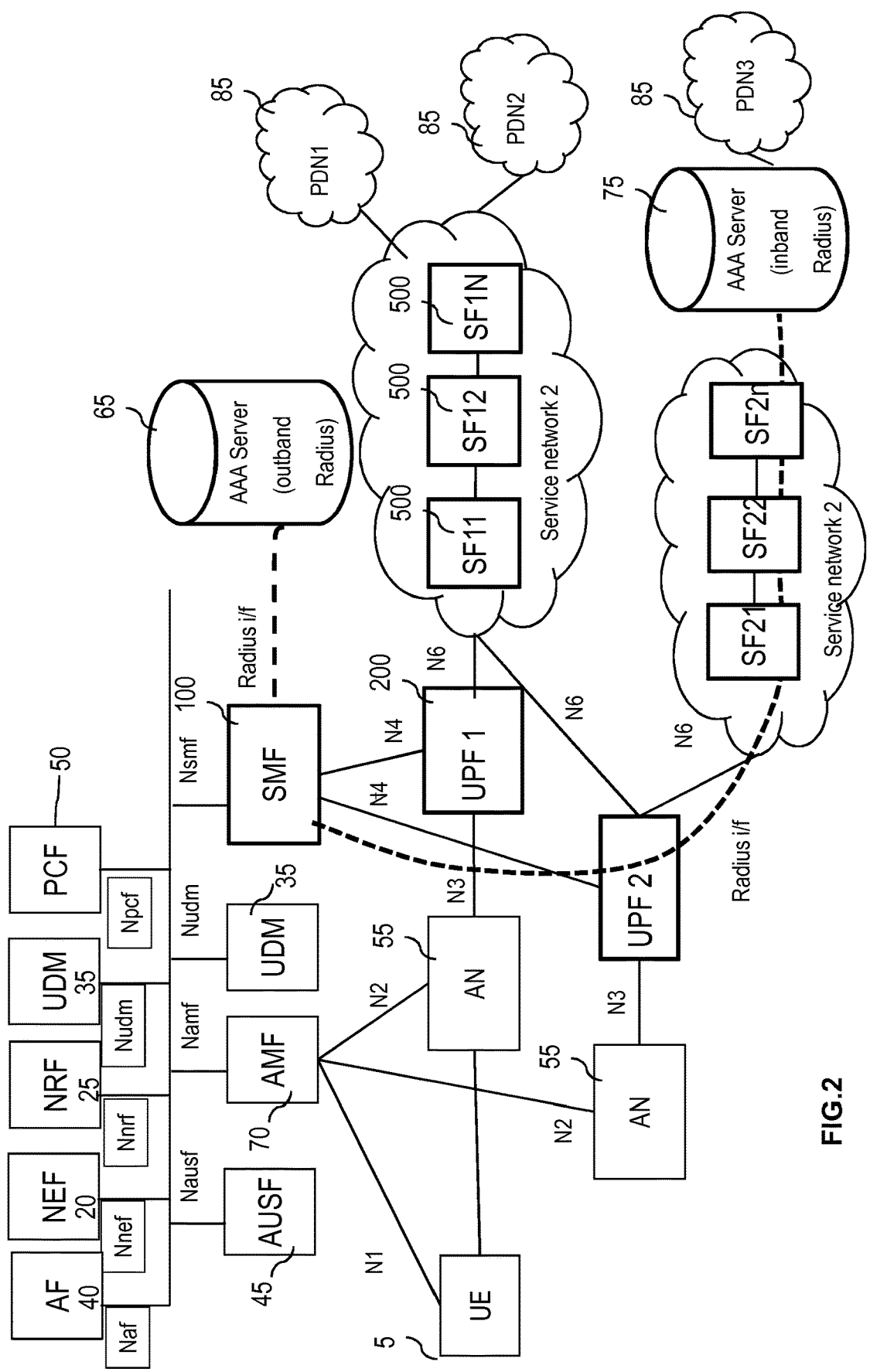
FIG. 2 shows an example schematic architectural view of a cellular network including service chains incorporating features of the invention.

FIG. 2 shows a schematic architectural view for a 5G service network in which a data packet session for a mobile subscriber is transmitted to the UE 5 via a chain of services provided by a different service application entities, 500, wherein the data packet session may originate from one of the packet data networks, 85. In the 5G core network in addition to the functions shown in FIG. 1, the Network Repository Function, NRF 25, the Unified Data Management, UDM 35, the Authentication Server Function, AUSF 45, and the Access Network, AN 55, are shown. Furthermore, different AAA servers 65, 75 are indicated.

In the example shown, a session control entity, SMF 100, controls the data packet session transmitted through the access network 55 to the UE 5 wherein the user plane data forwarding occurs by the user plane entities 200. Additionally, the AAA servers 65 and 75 are shown for the outbound and inbound radius communication.

In a 4G implementation, the session control entity 100 would be implemented by the control plane part of the packet gateway PGW-C or traffic detection function TDF-C and the user plane entity 200 could be implemented in the user plane part of the packet gateway PWF-U or traffic detection function TDF-U.

In the example shown, a chain of service functions is applied to the data packet session wherein the chain contains different service functions. However, it should be understood that the application is also applicable in the situation where a single service function 500 is applied to the data packet session.

Figure 3:
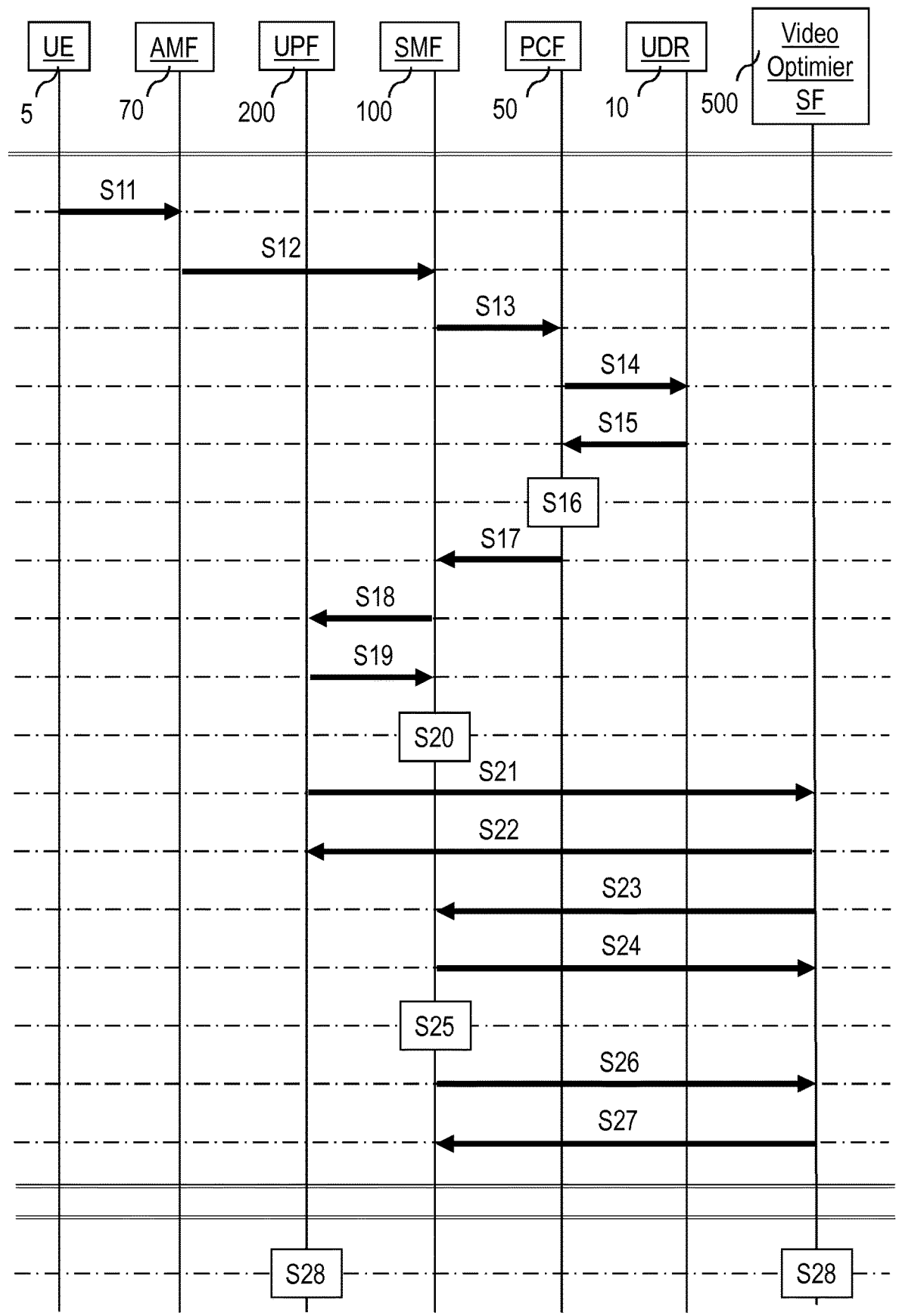
FIG. 3 shows a schematic view of a sequence diagram showing a message exchange between the involved entities incorporating features of the invention.

FIG. 3 discussed below allows the service functions 500 to be subscriber aware by means of extending the SMF exposure service with a new subscription session data event.

The sequence diagram shown in FIG. 3 illustrates the case where a video optimizer service function subscribes to the SMF exposure service to retrieve subscriber session information to apply video optimization for e.g. YouTube traffic for a specific user based on session data such as the radio access technology type, location etc.

In steps S11 and S12 the UE 5 triggers PDU session establishment, by means of sending a PDU Session Establishment Request to AMF 70 (PDU Session Establishment Request; Nsmf PDU Session Create). AMF selects an SMF 100 to manage the PDU session (the SMF selection function in the AMF selects an SMF instance based on the available SMF instances obtained from NRF 35 or on the configured SMF information in the AMF) and triggers Nsmf PDU Session Create. The sequence diagram in FIG. 3 does not include all the signaling messages involved in the PDU Session Establishment procedure. The relevant signaling messages are described in subsequent steps.

In step S13 the SMF 100 triggers a message to retrieve SM policies for the user PDU session (Npcf_SMPolicyControl_Create_Request).

In step S14 the PCF triggers a message to retrieve the policy data for this user PDU session (Nudr_DM_Query Request).

In step S15 the UDR 10 answers with response message including the Subscriber Policy Data. UDR 10 will return a traffic steering policy (trafficSteeringPolicyIdentifier) for a certain application (YouTube) (Nudr_DMQuery Response; {Subscriber Policy Data (afServiceId0Youtube, trafficSteeringPolicyIdentifyer}).

In steps S16 the PCF 50 generates the corresponding PCC rule/s based on Subscriber Policy Data.

In step S17 based on the above, PCF 50 triggers a response message including the PCC rules to be applied for this user PDU session. In this case, there will be a PCC rule for YouTube application including a traffic steering policy (trafficSteeringPolicyIdentifier) (Npcf_SMPolicyControl_Create Response; {PCC rule (appId=YouTube, trafficSteeringPolicyIdentifier}).

In step S18 the SMF 100 selects UPF 200 and triggers PFCP (Packet Forwarding Control Protocol) Session Establishment Request message including the corresponding PDRs/FARs/QERs/URRs. In this case, there will be a PDR (Packet Detection Rule) with PDI of type application with appId=YouTube, and a FAR including as Forwarding Policy the trafficSteeringPolicyIdentifier and the SMF identifier (smfId) (PFCD Session Establishment Request; {PDF with DPI (appId=YouTube), FAR (Forwarding Policy0trafficSteeringPolicyIdentifier, smfId}).

In step S19 the UPF 200 stores the PDRs/FARs/QERs/URRs and answers back to SMF with a PFCP Session Establishment Response message (PFCP Session Establishment Response).

In steps S20 and S21 the UPF determines which SFs 500 (in this case a Video Optimizer SF) are in the chain indicated by the trafficSteeringPolicyIdentifier. This is done by local UPF configuration, which includes the list of SFs mapped to a certain trafficSteeringPolicyIdentifier. Additionally, the presence of the smfId will activate some logic in UPF (specifically that the Video Optimizer SF will need to get notified about the fact that the SMF instance identified by smfId supports a service related to subscriber session data). Based on this, UPF 200 gives instructions to the Video Optimizer SF so it can subscribe to the new Subscriber Session Data Event. In order to do so, UPF triggers Naf HTTP POST message to the Video Optimizer SF. The body of HTTP POST message shall include information indicating that Subscriber Session information for the UE session (UESessionId) is available at a certain SMF (smfId). UESessionId should include information to allow the SF to identify the user session, e.g. the external user identity (externalId or gpsi) and/or the UE IP address. Alternatively, instead of using REST interface between UPF and the Video Optimizer SF, UPD could just add the smfId as metadata through NSH (Naf HTTP Post; {Subscriber session info for UESessionID at smfId}).

In step S22 after receiving the message in previous step, the Video Optimizer SF responds back to UPF 200 with a Naf 200 OK successful response (Naf 200 OK).

In step S23 the Video Optimizer SF subscribes to SMF 100 on Subscriber Session Data events for the UE's PDU session. In order to do so, the Video Optimizer SF triggers Nsmf HTTP POST message to the target SMF (determined by smfId, which could be just the SMF IP address). The body of HTTP POST message shall include information indicating subscription to the SMF Exposure service (Nsmf_EventExposure_Subscribe), and specifically to the new Subscriber Session Data Event (EventID=Subscriber Session Data) for a certain UE's PDU session (UESessionId). Additionally, the Video Optimizer SF might subscribe only to certain Subscriber Session parameters of interest (e.g. only RAT-Type and location) and/or limit the notification to a set of subscribers matching a certain condition. In this example, it is assumed the Video Optimizer SF is a trusted entity from network operator's point of view. If not, Video Optimizer SF should interact with the SMF through network operator's NEF (Nsmf HTT POST (Subscribe); {Nsmf_EventExposure_Subscribe, UESessionId, EventID=Subscriber Session Data}).

In step S24 after receiving the message in previous step, the SMF shall respond back to Video Optimizer SF 500 with a Nsmf 200 OK successful response (Nsmf 200 OK).

In steps S25 and S26 the SMF Event Exposure service notifies the consumer (Video Optimizer SF 500) of the Subscriber Session parameters of interest. In order to do so, SMF 100 triggers Nsmf HTTP POST message to the Video Optimizer SF. The body of HTTP POST message shall indicate notification relative to the SMF Exposure service (Nsmf_EventExposure_Notify), and specifically on the new Subscriber Session Data Event (EventID=Subscriber Session Data) for a certain UE's PDU session (UESessionId), including the relevant Subscriber Session parameters of interest (e.g. RAT-Type and location) (Nsmf HTTP POST (Notify); {Nsmf_EventExposure_Notify, UESessionId, EventID=Subscriber Session Data, Subscriber Session parameters (RAT-Type, Location, etc.)}).

In step S27 after receiving the message in previous step, the Video Optimizer SF shall respond back to SMF with a Nsmf 200 OK successful response (Nsmf 200 OK; PDU Session Establishment (continued); Application traffic (YouTube)).

In step S28 the user opens YouTube application. UPF detects YouTube traffic by matching the incoming packets with the PDR with PDI of type application with appId=YouTube and forwards this traffic to the Video Optimizer SF (according to the FAR which included as Forwarding Action the trafficSteeringPolicyIdentifier pointing to the Video Optimizer SF). The Video Optimizer SF applies video optimization for YouTube traffic based on the received Subscriber Session parameters in step S26 above (e.g. RAT-Type, location, etc.).

Additionally, UPF 200 (and not the SF 500) could be the one subscribing to the SMF Exposure service on Subscriber Session information. This could be the case where UPF requires UE's PDU session Subscriber Session information to perform certain enforcements (e.g. Video Optimizer SF embedded in UPF). UPF can consume this data locally e.g. to select traffic optimization profiles not addressed by 3GPP PCC rules or can expose this subscriber context to SFs by different methods such as e.g. inserting as NSH metadata, sending dummy Radius signaling from UPF to SFs, inserting in HTTP header.

Figure 4:
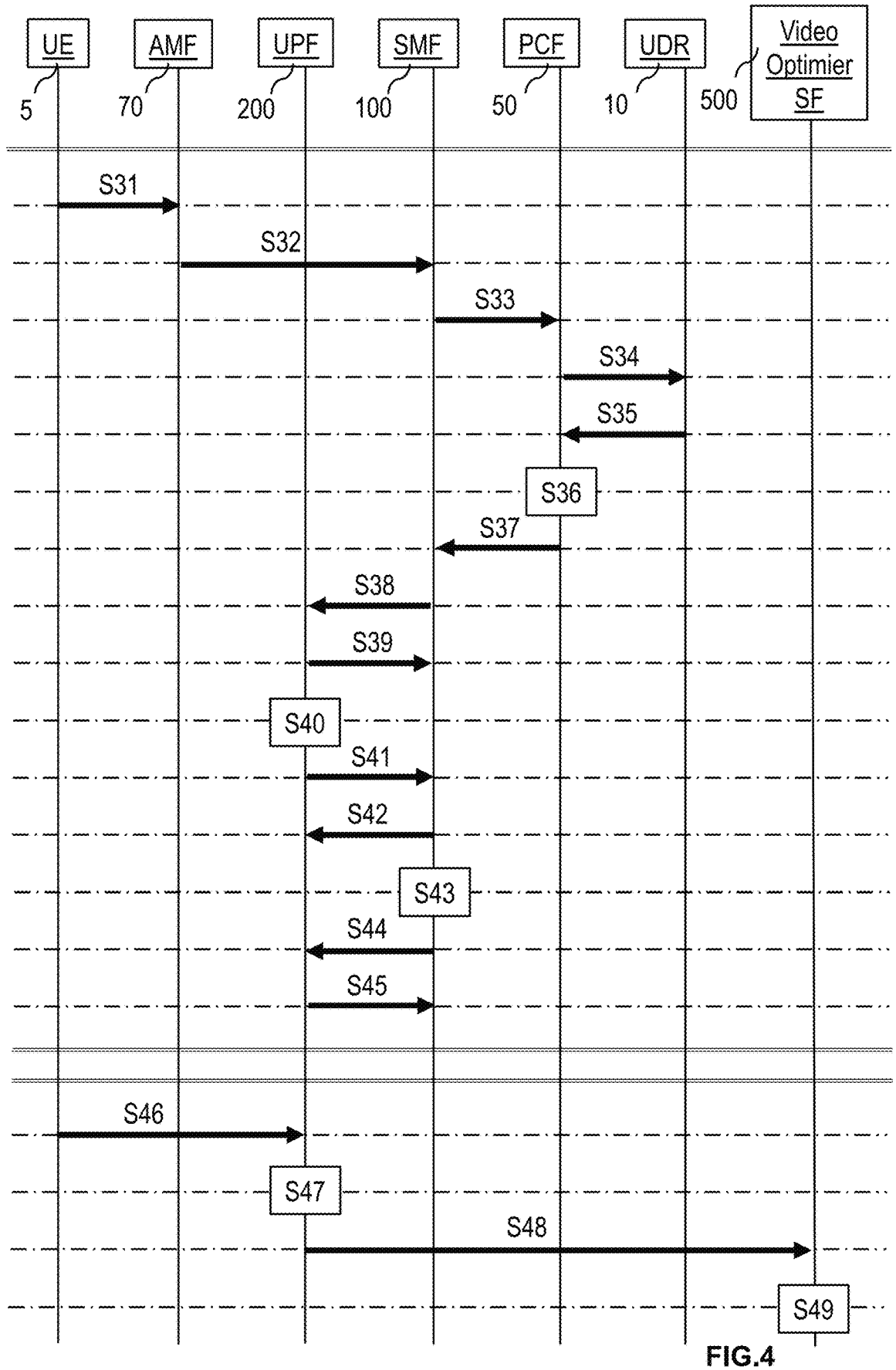
FIG. 4 shows another schematic view of a sequence diagram with the message exchange between the involved entities according to a further embodiment.

FIG. 4 illustrates the case where UPF subscribes to SMF Exposure Service to retrieve Subscriber Session information and forwards this information as metadata through NSH to the Video Optimizer SF, allowing Video Optimization for YouTube traffic for a specific user based on session data (e.g. RAT-Type, location, etc.). Steps of FIG. 4 are detailed below:

Steps S31 to S39 correspond to steps S11 to S19 of FIG. 3.

In steps S40 and S41 the UPF 200 retrieves the smfId and subscribes to SMF on Subscriber Session Data events for the UE's PDU session. In order to do so, the UPF triggers Nsmf HTTP POST message to the target SMF (determined by smfId, which could be just the SMF IP address). The body of HTTP POST message should include information indicating subscription to the SMF Exposure service (Nsmf_EventExposure_Subscribe), and specifically to the new Subscriber Session Data Event (EventID=Subscriber Session Data) for a certain UE's PDU session (UESessionId). Additionally, the UPF might subscribe only to certain Subscriber Session parameters of interest (e.g. only RAT-Type and location) and/or limit the notification to a set of subscribers matching a certain condition (Nsmf HTT POST (Subscribe); {Nsmf_EventExposure_Subscribe, UESessionId, EventID=Subscriber Session Data}).

In step S42 after receiving the message in previous step, the SMF 100 responds back to UPF with a Nsmf 200 OK successful response (Nsmf 200 OK).

Steps S43 and S44 the SMF Event Exposure service notifies the consumer (UPF) of the Subscriber Session parameters of interest. In order to do so, SMF triggers Nsmf HTTP POST message to the UPF. The body of HTTP POST message shall indicate notification relative to the SMF Exposure service (Nsmf_EventExposure_Notify), and specifically on the new Subscriber Session Data Event (EventID=Subscriber Session Data) for a certain UE's PDU session (UESessionId), including the relevant Subscriber Session parameters of interest (e.g. RAT-Type and location) (Nsmf HTTP POST (Notify); {Nsmf_EventExposure_Notify, UESessionId, EventId=Subscriber Session Data, Subscriber Session parameters (RAT-Type, Location, etc.)}).

In step S45 after receiving the message in previous step, the UPF 200 responds back to SMF 100 with a Nsmf 200 OK successful response (Nsmf 200 OK PDU Session Establishment (continued); Application Traffic (YouTube)).

Steps S46, S47 and S48 the user opens YouTube application. UPF 200 detects YouTube traffic by matching the incoming packets with the PDR with PDI of type application with appId=YouTube and forwards this traffic to the Video Optimizer SF (according to the FAR which included as Forwarding Action the trafficSteeringPolicyIdentifier pointing to the Video Optimizer SF). UPF adds as metadata through NSH (e.g. only in the first packet of the flow) the Subscriber Session parameters retrieved in S44 above (YouTube traffic) (YouTube traffic; {NSH metadata including Subscriber Session parameters (RAT-Type, Location, etc.)}).

In step S49 the Video Optimizer SF applies video optimization for YouTube traffic based on the received Subscriber Session parameters (e.g. RAT-Type, location, etc.).

Figure 5:
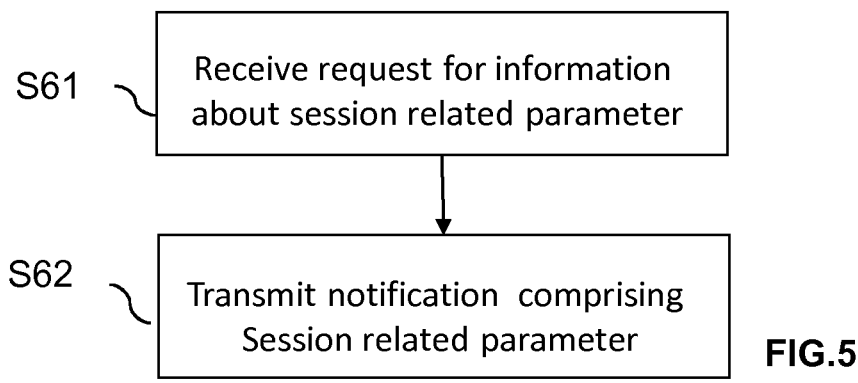
FIG. 5 shows an example flow chart of a method carried out by the session control entity in a situation as shown in FIG. 3 or 4.

FIG. 5 shows in a generalized way the steps carried out by the session control entity or SMF 100 in the embodiments in FIGS. 3 and 4. In the step S61 the SMF 100 receives the request for information about the session related parameter. In the examples given above it was the subscription request of step S23 in FIG. 3 or step S41 in FIG. 4. Furthermore, in response to the subscription the SMF 100 transmits the notification comprising the requested session related parameter in step S62. In FIG. 3 this corresponds to step S26 and in FIG. 4 to step S44.

The received request may be such that it is requested that the requesting party, be it the service application entity 500 or the UPF 200, be informed of any future change of the session related parameter. Each time a change in the session related parameter is detected the requesting party is informed accordingly. In the example above this was implemented by way of a subscription.

Figure 6:
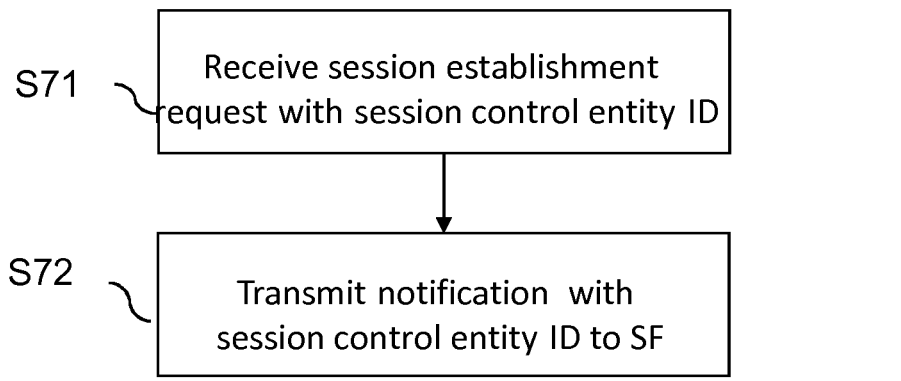
FIG. 6 shows an example flow chart of a method carried out by a user plane entity in a situation as shown in FIG. 3.

FIG. 6 summarizes the steps carried out at the user plane entity 200. In step S71 the user plane entity 200 receives the session establishment request with the identifier of the session control entity. This corresponds to step S18 discussed in connection with FIG. 3. In step S72 the user plane entity then transmits a notification with the session control entity identifier to the service application entity 500 so that the service application entity is aware of the session control entity handling the data packet session. With the information provided the service application entity can then subscribe to the requested service provided by the session control entity. Step S72 is implemented in FIG. 3 by step S21.

Figure 7:
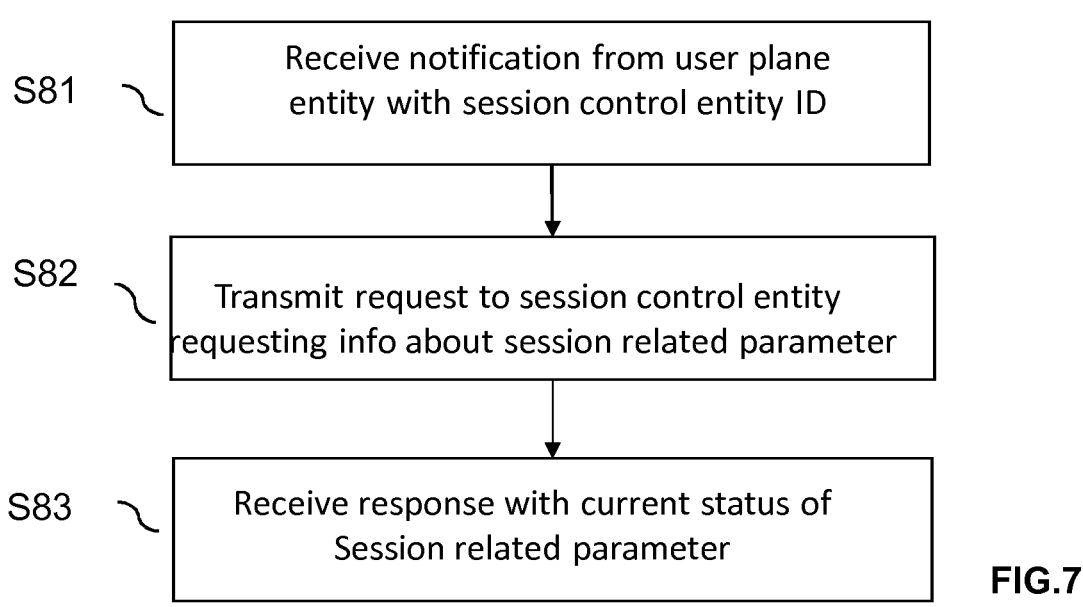
FIG. 7 shows an example flow chart of a method carried out by a service application entity applying a service to a data packet session in the situation shown in FIG. 3.

As far as the service application entity 500 is concerned, some of the main steps are summarized in FIG. 7. In step S81 the service application entity 500 receives the notification from the user plane entity 200 with the identifier of the session control entity as discussed above in connection with step S72. In step S82 the service application entity then transmits the request to the session control entity 100 requesting the information about the session related parameter. Step S81 was implemented by step S21 whereas step S82 is implemented in FIG. 3 in step S23. Finally, in step S83 the service application entity receives the response with the current status of the session related parameter as implemented in step S26 in FIG. 3.

Figure 8:
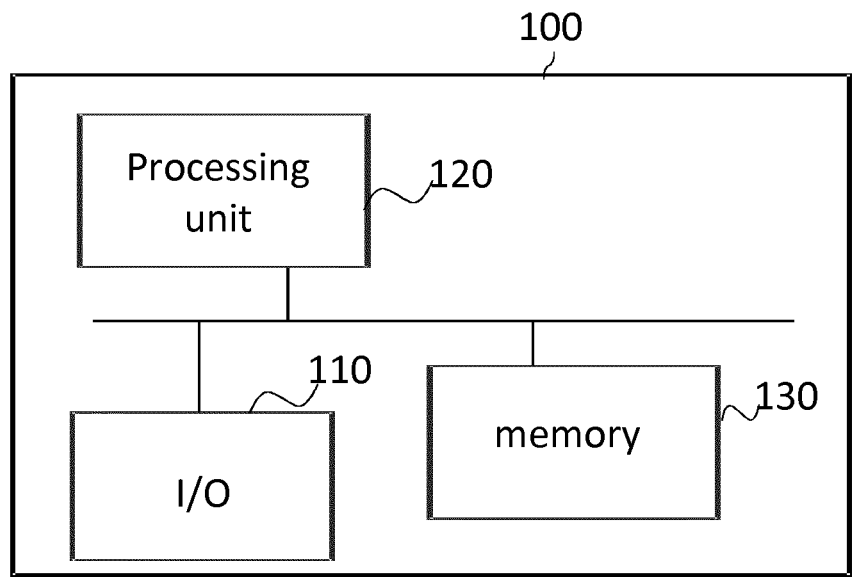
FIG. 8 shows an example schematic representation of a session control entity configured to control the data packet session incorporating features of the invention.

FIG. 8 shows a schematic architectural view of the SMF 100 which can carry out the above discussed steps in which the SMF 100 is involved. The SMF 100 comprises an input/output or interface 110 which is configured to transmit user data or control messages to other entities and is configured to receive user data or control messages from other entities. By way of example, the interface 110 is configured to receive the subscription request of the service application entity 500 and is configured to inform the service application entity accordingly of the subscriber session parameters. Furthermore, the interface is configured to inform the user plane entity 200 about its identifier as discussed above in connection with step S18. The SMF 100 furthermore comprises a processing unit 120 which is responsible for the operation of the SMF 100. The processing unit 120 comprises one or more processors and can carry out instructions stored by memory 130, wherein the memory may include a read-only memory, a random access memory, a mass storage, hard disc or the like. The memory 130 furthermore includes suitable program code to be executed by the processing unit 120 so as to implement the above described functionalities in which the SMF 100 is involved.

Figure 9:
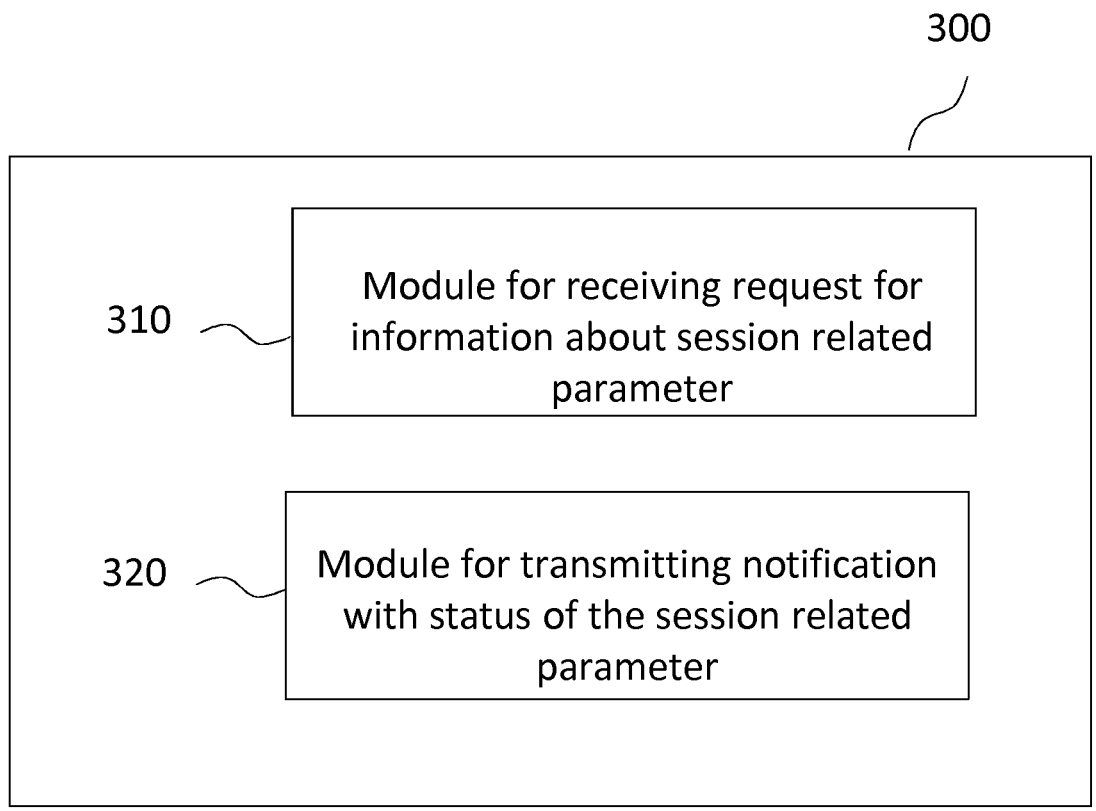
FIG. 9 shows another example schematic representation of the session control entity of FIG. 8.

FIG. 9 shows another example schematic representation of an SMF 300 which comprises a first module 310 configured to receive the request for the information about the session related parameter. Furthermore, a second module 320 is provided configured to transmit the notification with the status of the session related parameter to the requesting entity which can be the service application entity directly or the UPF as shown in FIG. 4.

Figure 10:
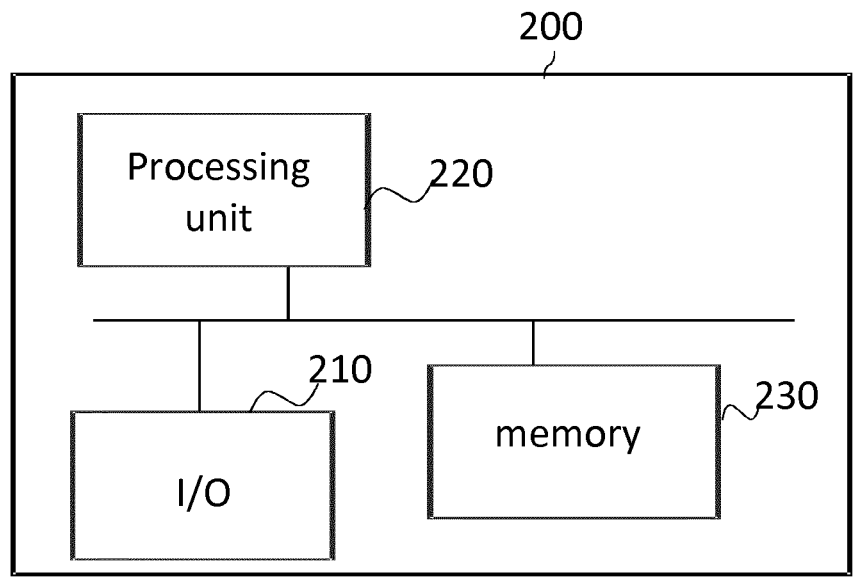
FIG. 10 shows an example schematic representation of a user plane entity incorporating features of the invention.

FIG. 10 shows a schematic architectural view of the user plane entity 200 which can carry out the above discussed steps in which the UPF 200 is involved as shown in FIGS. 3 and 4. The user plane entity comprises an input/output or interface 210 configured to transmit user data or control messages and configured to receive user data or control messages. The interface 210 is configured to receive the identifier of the SMF 100 as mentioned above in step S18 and is configured to transmit the information about the identified SMF to the service application entity as mentioned above in step S21.

The UPF 200 furthermore comprises a processing unit 220 which is responsible for the operation of the UPF 200. The processing unit 220 comprises one or more processors and can carry out instructions stored on a memory 230, wherein the memory may include a read-only memory, a random access memory, a mass storage, a hard disk or the like. The memory furthermore includes suitable program code to be executed by the processing unit so as to implement the above described functionalities in which the UPF 200 is involved.

Figure 11:
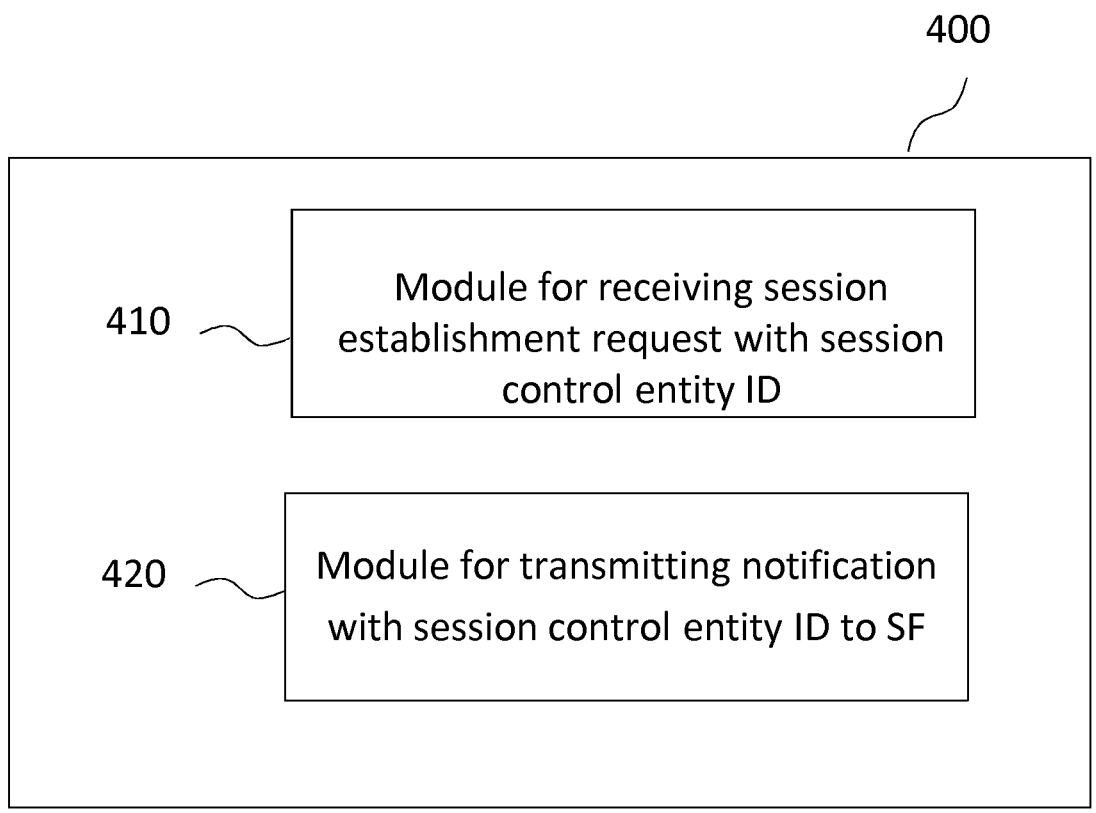
FIG. 11 shows another example schematic representation of a user plane entity ending the user plane of the data packet session and incorporating features of the invention.

FIG. 11 shows another example schematic representation of a user plane entity 400 comprising a first module 410 configured to receive the session establishment request with the identifier of the session control entity 100 as discussed above in connection with FIGS. 3 and 4. The user plane entity 400 furthermore comprises a second module 420 for transmitting the notification with the session control entity identifier to the service application entity 500.

Figure 12:
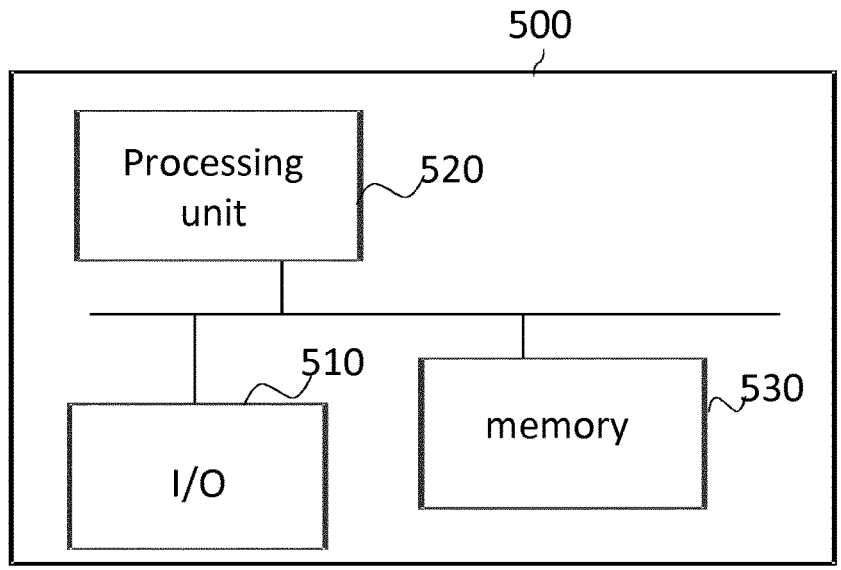
FIG. 12 shows an example schematic representation of a service application entity applying a service to the data packet session incorporating features of the invention.

FIG. 12 shows a schematic architectural view of a service application entity 500 which can carry out the above discussed steps in which the SF 500 is involved as shown in FIG. 3 or 4. The service application entity 500 comprises an input/output or interface 510 configured to receive control messages or user data and configured to transmit control messages or user data. The interface 510 is especially configured to receive the information about the identifier identifying the SMF. The interface 510 is furthermore configured to transmit the subscription request to the SMF 100 and is configured to receive the response to the subscription.

The service application entity 500 furthermore comprises a processing unit 520 which is responsible for the operation of the service application entity 500. The processing unit 520 comprises one or more processors and can carry out instructions stored on a memory 530 wherein the memory may include a read-only memory, a random access memory, a mass storage, a hard disk or the like. The memory furthermore includes suitable program code to be executed by the processing unit 520 so as to implement the above described functionalities in which the SF 500 is involved.

Figure 13:
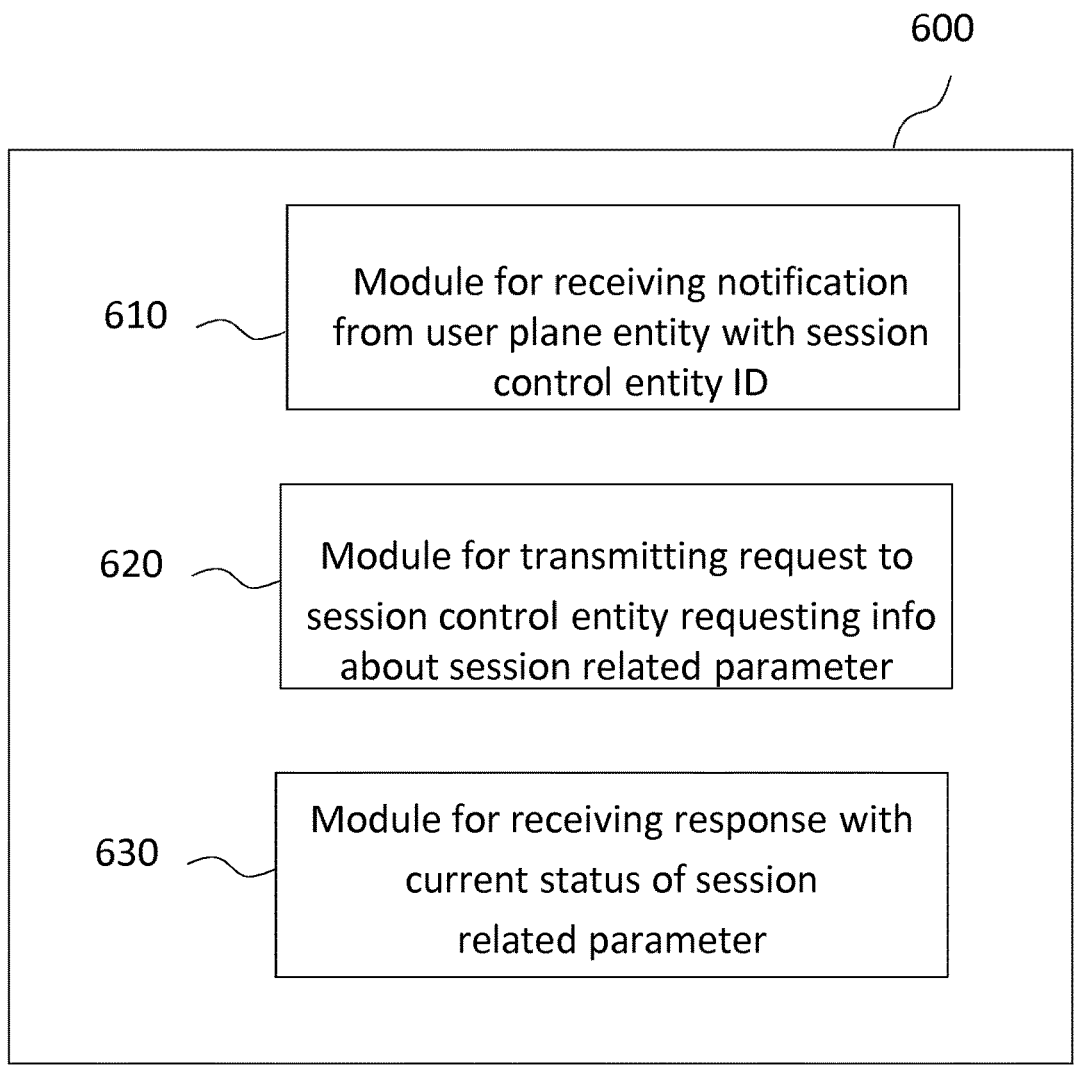
FIG. 13 shows another example schematic representation of the service application entity providing a service to the data packet session incorporating features of the invention.

FIG. 13 shows another example schematic representation of a service application entity 600. This entity 600 comprises a first module 610 configured for receiving the notification from the user plane entity 200 with the identifier of the session control entity 100 which controls the data packet session for which the service application entity 600 should provide a service.

A second module 620 is provided configured to transmit the request to the session control entity 100 in which it requests information about the session related parameter. As discussed above the request may be a subscription request. A third module 630 is provided which receives the response with the current status of the session related parameter from the session control entity.

From the above said some general conclusions can be drawn for the different entities. As far as the session control entity or SMF 100 is concerned, as discussed above a first request is received either from the SF 500 or the user plane entity 200 requesting that the requesting party is informed of the current status of the session related parameter of the data packet session. This request is based on the fact that the service application entity was informed about the identifier which session control entity is handling the data packet session. Preferably before this first request is received a session establishment request may be transmitted to the user plane entity for establishing the data packet session. This session establishment request can comprise the session control entity identifier which allows the session control entity to be identified. In the embodiments discussed above this was implemented by step S18 in FIG. 3 or as step S38 in FIG. 4.

This information about the session control entity identifier is used by the user plane entity 200 to transmit this identifier to the service application entity 500 which can then address the right SMF in order to apply the requested service to the data packet session.

The received first request requesting the current status of the session related parameter can furthermore request that the requestor is informed of any future change of the at least one session related parameter, and the notification is transmitted to the requestor whenever a change in the at least one session related parameter is detected.

This can be implemented by a subscription, however any other implementation is possible.

Furthermore, a chain of services may be applied to the data packet session as shown in FIG. 2 and the service application entity 500 providing the at least one service to the data packet session may be part of the chain of the services.

Furthermore it is possible that a user plane rule is determined indicating a steering policy identifier to identify the service application entity that provides the at least one service for the mobile subscriber. The user plane rule may then be transmitted to the user plane entity 200.

Furthermore, a policy control rule may be retrieved by the session control entity 100 from a policy control entity which comprises a steering policy for the mobile subscriber. The transmission of the user plane rule may be part of the transmission of the session establishment request.

The requesting party may be the service application entity 500 or the user plane entity 200. In a 5G implementation the reception of the first request can mean that a subscription is received to an exposure service provided by the session control entity 100, the subscription indicates the subscription of the requestor as a consumer of the exposure service to any event related to the at least one session related parameter of the data packet session.

The subscription can comprise a session identifier identifying the data packet session. The subscription may furthermore comprise a subscriber identifier identifying a single subscriber or a group of subscribers and the subscription may furthermore comprise a session related parameter to match an identification of a group of subscribers.

The transmission of the notification can comprise the step of notifying the consumer of an identity of the subscription service, of the session identifier and of the at least one session related parameter. This was discussed in detail above in connection with step S23 of FIG. 3.

When the notification is transmitted to the requestor the consumer of the subscription is notified about the identity of the subscription service, of the session identifier and of the at least one session related parameter.

The session related parameter can comprise a subscriber identity or any other non-subscriber related parameter such as any other session related parameter, e.g., the RAT-type.

As far as the user plane entity 200 is concerned a chain of services may be applied to the data packet session and the service application entity 500 provides the at least one service as a part of the chain of services. Each service application entity provides at least one service in the chain of services and the first notification including the identifier of the session control entity may be transmitted to each of the service application entities provided in the chain.

The first notification can comprise an indication that the session control entity 100 identified by the session control entity identifier is configured to provide an exposure service related to the data packet session allowing the service application entity to subscribe to the exposure service.

This first notification can comprise the session control entity identifier.

Furthermore, the user plane entity 500 may receive from the session control entity 100 a user plane rule indicating a steering policy identifier to identify the service application entity that provides the at least one service for the mobile subscriber.

As far as the service application entity 500 is concerned the first notification can comprise the indication that the session control entity 100 identified by the first notification is configured to provide an exposure service related to the data packet session allowing the service application entity to subscribe to the exposure service. The transmission of the first request can comprise the step of transmitting a subscription to the exposure service provided by the session control entity 100, wherein the subscription indicates the subscription of the service application entity as a consumer of the exposure service to any event related to the at least one session related parameter of the data packet session.

The first request transmitted to the session control entity 100 may further request that the service application entity be informed of any future change of the at least one session related parameter. A notification may be received whenever a change in the at least one session related parameter is detected.

The above discussed application has the advantage that it decouples the deployment of the service function from the radius deployment which was intended to address a different use case then service function subscriber awareness. This results in considerable savings as the integration of the service functions can be significantly simplified. In addition, providing an alternative solution to RADIUS ensures any service function can be service aware as in some cases the RADIUS integration is not viable or RADIUS accounting is not enabled.

The above discussed mechanism furthermore optimizes the resources by saving unnecessary CPU and memory resources so that the service application entity only receives the relevant information. This allows the deployment of nodes with less processing capacity so that the amount of invested money and resources can be reduced.

The invention claimed is:

1. A session control entity configured to control a data packet session of a mobile subscriber in a cellular network, at least one service being applied to the data packet session, the session control entity comprising a memory and at least one processing unit, the memory containing non-transitory instructions executable by the at least one processing unit for causing the session control entity to:

receive a first request from a service application entity located outside the cellular network of the mobile subscriber and in a service network requesting application of the at least one service, in which it is requested that the service application entity be informed of a current status of at least one session related parameter of the data packet session;

transmit a notification to the service application entity, the notification comprising the current status of the at least one session related parameter; and transmit a session establishment request for establishing the data packet session to a user plane entity configured to forward user plane data of the data packet session, the session establishment request comprising a session control entity identifier allowing the session control entity to be identified.

2. The session control entity according to claim 1, wherein the first request further requests that the service application entity be informed of any future change of the at least one session related parameter, the session control entity further configured to transmit the notification to the service application entity whenever a change in the at least one session related parameter is detected.

3. The session control entity according to claim 1, wherein a chain of services is applied to the data packet session, the service application entity providing the at least one service as part of the chain of services.

4. The session control entity according to claim 1, further configured to determine a user plane rule indicating a steering policy identifier to identify the service application entity that provides the at least one service for the mobile subscriber; and to transmit, toward the user plane entity, the user plane rule.

5. The session control entity according to claim 4, further configured to retrieve, from a policy control entity, a policy control rule that comprises a steering policy for the mobile subscriber, and operative, for transmitting the session establishment request, to transmit the user plane rule.

6. The session control entity according to claim 1, wherein the service application entity is a user plane entity configured to forward user plane data of the data packet session.

7. The session control entity according to claim 1, further configured, for receiving the first request, to receive a subscription to an exposure service provided by the session control entity, the subscription indicating the subscription of the service application entity as a consumer of the exposure service to any event related to the at least one session related parameter of the data packet session.

8. The session control entity according to claim 7, wherein the subscription comprises a session identifier identifying the data packet session.

9. The session control entity according to claim 7, wherein the subscription comprises a subscriber identifier identifying a single subscriber or a group of subscribers.

10. The session control entity according to claim 8, wherein the subscription comprises a session related parameter to match in identifying a group of subscribers.

11. The session control entity according to claim 7, further configured, for transmitting the notification, to notify the consumer of an identity of the subscription service, of the session identifier and of the at least one session related parameter.

12. A user plane entity configured to forward user plane data of a data packet session for a mobile subscriber in a cellular network, at least one service being applied to the data packet session by a service application entity, the user plane entity comprising a memory and at least one processing unit, the memory containing non-transitory instructions executable by the at least one processing unit for causing the user plane entity to:
receive, from a session control entity, a session establishment request for establishing the data packet session, the session establishment request comprising a session control entity identifier allowing the session control entity configured to control the data packet session to be identified;
transmit a first notification to the service application entity about the session control entity, the first notification allowing the session control entity which will control the data packet session to be identified; and
the service application entity located outside the cellular network of the mobile subscriber and in a service network.

13. The user plane entity according to claim 12, wherein a chain of services is applied to the data packet session and the service application entity providing the at least one service as part of the chain of services, further configured to identify each service application entity providing at least one service in the chain of services, and to transmit the first notification to each service application entity providing at least one service in the chain of services.

14. The user plane entity according to claim 12, wherein the first notification comprises an indication that the session control entity identified by the session control entity identifier is configured to provide an exposure service related to the data packet session allowing the service application entity to subscribe to the exposure service.

15. The user plane entity according to claim 12, further configured, to receive from the session control entity, a user plane rule indicating a steering policy identifier to identify the service application entity that provides the at least one service for the mobile subscriber.

16. A service application entity configured to apply at least one service to a data packet session of a mobile subscriber in a cellular network and comprising a memory and at least one processing unit, the memory containing non-transitory instructions executable by the at least one processing unit for causing the service application entity to:
receive a first notification from a user plane entity configured to forward user plane data of the data packet session, the first notification allowing a session control entity which will control the data packet session to be identified;
transmit a first request to the session control entity requesting to be informed of a current status of at least one session related parameter of the data packet session;
receive a response to the first request comprising the current status of the at least one session related parameter; and
the service application entity located outside the cellular network of the mobile subscriber and in a service network.

17. The service application entity according to claim 16, wherein the first notification comprises an indication that the session control entity identified by the first notification is configured to provide an exposure service related to the data packet session allowing the service application entity to subscribe to the exposure service, wherein the service application entity, for transmitting the first request, is configured to transmit a subscription to the exposure service provided by the session control entity, the subscription indicating the subscription of the service application entity as consumer of the exposure service to any event related to the at least one session related parameter of the data packet session.

18. The service application entity according to claim 16, wherein the first request further requests to be informed of any future change of the at least one session related parameter, the service application entity being configured to receive a notification whenever a change in the at least one session related parameter is detected.

19. A method for controlling a data packet session for a mobile subscriber in a cellular network, the method comprising:
at a session control entity:
receiving a first request from a service application entity located outside the cellular network of the mobile subscriber and in a service network requesting application of at least one service in which it is requested that the service application entity be informed of a current status of at least one session related parameter of the data packet session; and
transmitting a first notification to the service application entity, the first notification comprising the current status of the at least one session related parameter;
at a user plane entity:
receiving, from the session control entity, a session establishment request for establishing the data packet session, the session establishment request comprising a session control entity identifier allowing the session control entity to control the data packet session; and transmitting a second notification to the service application entity about the session control entity, the second notification allowing the session control entity to be identified; and at the service application entity:

receiving the second notification from the user plane entity;

transmitting a first request to the session control entity requesting to be informed of a current status of at least one session related parameter of the data packet session; and receiving a response to the first request comprising the current status of the at least one session related parameter.

\* \* \* \* \*